United States Patent [19]
Lin et al.

[11] Patent Number: 5,843,768
[45] Date of Patent: Dec. 1, 1998

[54] VENTILATED WASTE COLLECTING CONTAINER

[76] Inventors: Dennis J. Lin; Kent K. Knock, both of 39 Oronoque Trail, Shelton, Conn. 06484

[21] Appl. No.: 779,979

[22] Filed: Dec. 23, 1996

[51] Int. Cl.$^6$ .................................................. C05F 9/02
[52] U.S. Cl. ................................... 435/290.1; 435/290.4; 71/9; 220/913
[58] Field of Search .............................. 435/290.1, 290.2, 435/290.4, 262; 220/367.1, 371, 372, 908, 913; 55/385.4, 421, 512; 210/472; 71/9

[56] References Cited

U.S. PATENT DOCUMENTS

| | | | |
|---|---|---|---|
| 232,072 | 9/1880 | Sassinot | 210/472 |
| 285,965 | 10/1883 | Burgess | 210/472 |
| 1,696,487 | 12/1928 | Jervis | 210/472 |
| 3,958,715 | 5/1976 | Capelli | 220/22 |
| 4,818,260 | 4/1989 | Minnella | 55/385.4 |
| 5,031,796 | 7/1991 | Shafer et al. | 220/571 |
| 5,036,999 | 8/1991 | Bitsch | 220/627 |
| 5,118,005 | 6/1992 | Onodera | 435/290.1 |
| 5,156,290 | 10/1992 | Rodriques | 220/87.1 |
| 5,171,690 | 12/1992 | Ylosjoki | 435/290.1 |
| 5,185,261 | 2/1993 | Warrington | 435/290.1 |
| 5,205,433 | 4/1993 | Bitsch | 220/572 |
| 5,375,732 | 12/1994 | Bowers et al. | 220/404 |
| 5,545,559 | 8/1996 | Kariniemi | 435/290.1 |

FOREIGN PATENT DOCUMENTS

| | | | |
|---|---|---|---|
| 33 44 951 | 12/1985 | Germany | 435/290.1 |
| 34 44 672 | 6/1986 | Germany | 435/290.1 |
| 38 02 499 | 12/1988 | Germany | 435/290.1 |
| 41 13 993 | 12/1991 | Germany | 435/290.1 |
| 59-22700 | 2/1984 | Japan | 435/290.1 |

*Primary Examiner*—William H. Beisner

[57] ABSTRACT

A container for collecting and storing compostable waste while minimizing offensive odors and the accumulation of insect or other pests near the container by providing specially designed ventilation and drainage. As shown in FIG. 1, the enclosed volume (12) of the bucket-like portion (1) is ventilated by means of a solid ventilation shaft (4) which penetrates the sealable lid (3) and passes air to and from the drainage chamber (7) below the suspended floor (5). Air below the suspended floor (5) circulates through ventilation/drainage holes (6) and the enclosed volume (12) and the contained waste. The circulating air maintains aerobic conditions in the waste thus minimizing offensive odors that would accompany anaerobic conditions. Water is allowed to drain from the waste through the ventilation/drainage holes and collect in the drainage chamber (7) below the suspended floor (5), where it cannot contribute to anaerobic conditions in the waste. The escape of insect pests is inhibited by the circuitous path which they must follow to escape the container. When the lid is sealed insects can only reach the waste by following the air path described above. Once in the enclosed volume (12) the insects tend to be trapped and cannot find their way out.

10 Claims, 5 Drawing Sheets

VENTILATED WASTE COLLECTING CONTAINER

BACKGROUND—FIELD OF INVENTION

The field of this invention is the waste collecting containers, particularly a container with a sealable lid and provisions for internal drainage and ventilation designed to reduce odors and attraction of pests.

BACKGROUND—DESCRIPTION OF PRIOR ART

It is desirable to recycle organic wastes by composting them into soil amendments. Such recycling reduces waste volume entering landfills while providing compost for enrichment of soils to enhance future growth of crops. Collection of items such as vegetable trimming and food scraps, however, often creates undesirable odors and attracts insects. Odors result from anaerobic decomposition prompted by poor air circulation or accumulation of water in simple waste containers.

Several patents have issued for a garbage container with improved air circulation and water separation. Patents by Bitsch (5,036,999 and 5,205,433) and Shafer (5,031,796) teach modifications of commercial curbside garbage collection containers. Space is provided at the bottom of the container by means of a ventilated grate. That space allows for collection of water and improved ventilation around and through the waste in an attempt to maintain aerobic conditions. The disadvantages of these arrangements include complication of manufacture of the basic container and ventilation holes though the main container body. Also, those ventilation holes provide means of entry for insects and other pests as well as routes of escape for liquids, which often drain from compostable materials and partially fill the container, thus bringing any accumulated water in contact with the vents.

Patent 5,156,290, issued to Rodrigues, also provides for ventilation through the bottom of the main waste receptacle of a garbage container. This container design has several advantages including lack of internal structure (for ease of emptying) and insulating walls for maintaining uniform temperature. It has a significant disadvantage, however, in that it is complicated and would be expensive to make.

Patent 3,958,715, issued to Capelli, teaches a means of minimizing mildew and odors in a clothes hamper by providing ventilation holes in the container walls and an internal compartment partition.

Patent 5,375,732, issued to Bowers et al., teaches a vacuum release structure built into a garbage can. The vacuum release provides an air path to the bottom of the container so a vacuum does not form when the container is inverted for emptying. Relief of the vacuum allows the garbage to slide out of the container more easily.

OBJECTS AND ADVANTAGES

Accordingly, several objects and advantages of this invention are simplicity, ease of manufacture, improved airflow through the contained organic matter resulting in less malodorous emissions and a tendency to confine fruit flies and other insect pests to the interior of the enclosed container.

Still further objects and advantages will become apparent from a consideration of the ensuing description and accompanying drawings.

Figure 1:
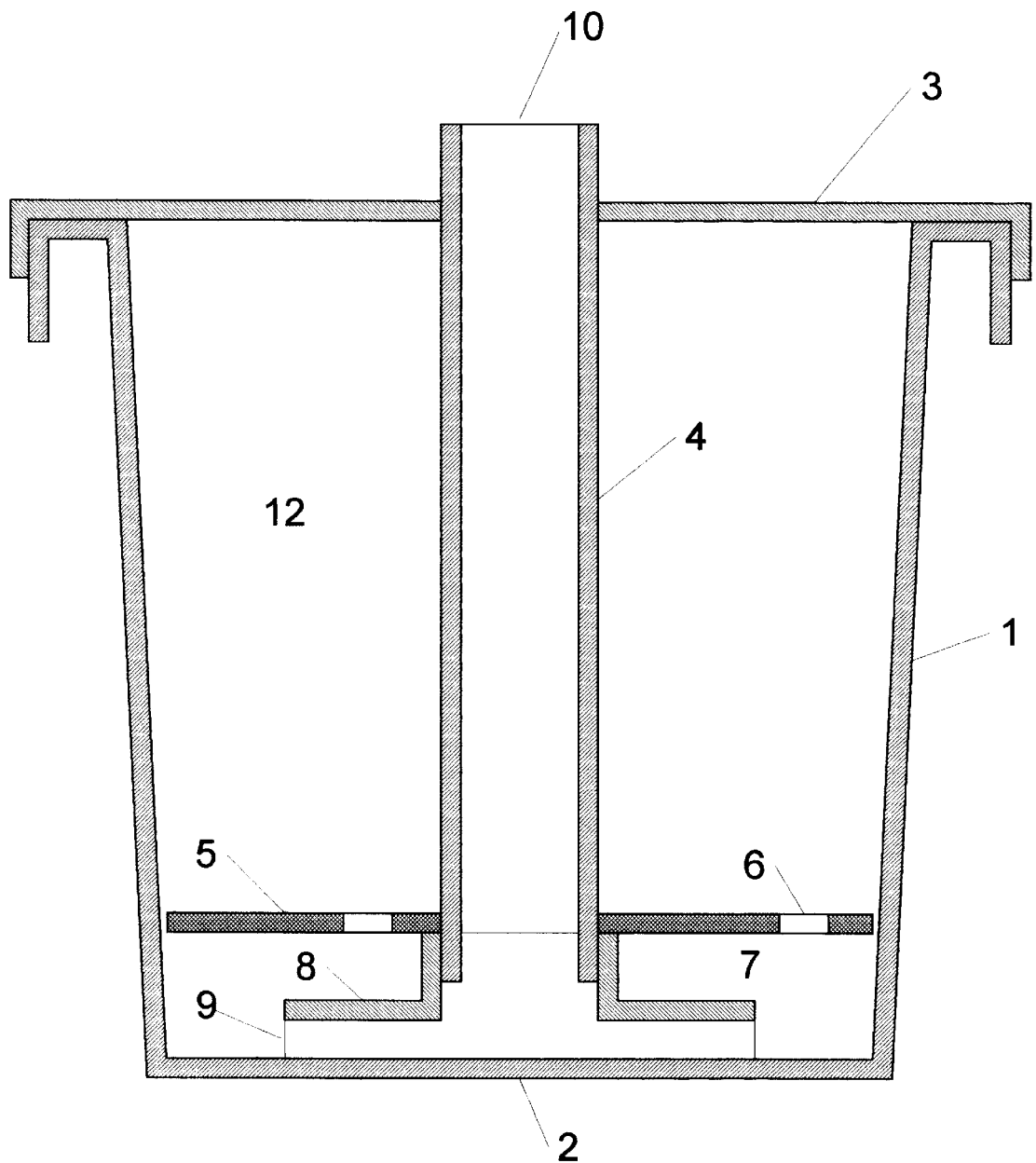
FIG. 1 is a sectional longitudinal view of the first embodiment of the invention.

REFERENCE NUMERALS 1 bucket-like portion
2 bottom
3 lid
4 solid ventilation shaft
5 suspended floor
6 ventilation/drainage holes
7 drainage chamber
8 support structure
9 openings
10 upper opening
11 shaft elbow(s)
12 enclosed space
14 upper container wall

SUMMARY

This invention comprises a waste collecting container including:

a) a receptacle for receiving the waste b) a lid for securely sealing off the receptacle from the surroundings c) a means of ventilation which provides air to the contained waste in such a manner that aerobic conditions are favored over odor producing anaerobic conditions d) a means for allowing water to drain away from the contained waste but to remain securely enclosed in the container e) a means for preventing insects, such as fruit flies, from moving freely into and out from the waste receptacle and annoying people near the container.

Items (c) through (e) are accomplished by an internal structure placed in the waste container. The structure and its functionality are shown in the figures and descriptions.

Preferred Embodiment—Description

Figure 2:
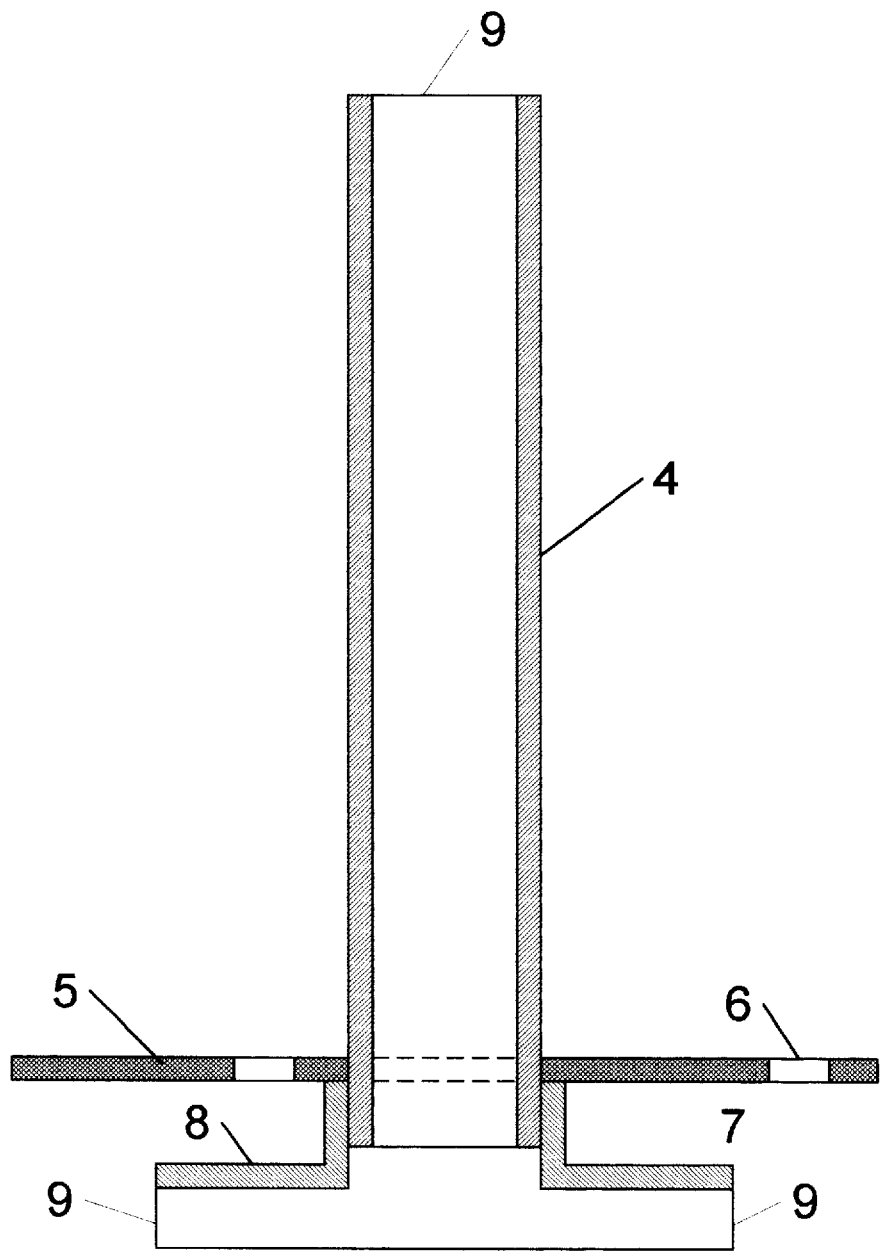
FIG. 2 is a side view of the internal ventilating device of the first embodiment of the invention.
Figure 3:
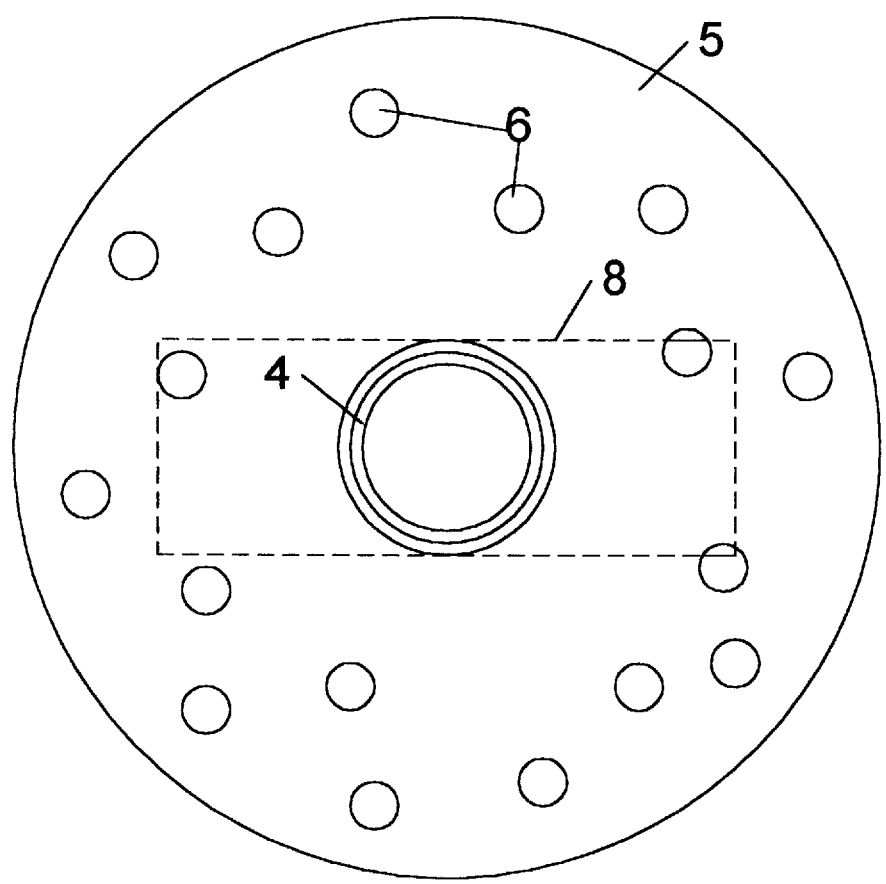
FIG. 3 is a top view of the internal ventilating device of the first embodiment of the invention.

The first embodiment of the invention is represented in FIGS. 1, 2, and 3. As shown in FIG. 1, the outside of this invention is an airtight container comprising a bucket-like portion 1 with an integral bottom 2 and a lid 3 which can form an airtight seal to bucket-like portion 1. Inside the container is a device to provide for ventilation and separation of liquids from solids. This device is shown separately in FIGS. 2 and 3. The cross sectional view of the ventilation device in FIG. 2 shows the suspended floor 5 and the solid ventilation shaft 4. The suspended floor 5 is penetrated by ventilation/drainage holes 6. The support structure 8 supports the suspended floor 5. An example of such a support structure is a "T" pipe joint from which a portion of the top of the "T" had been removed to allow the "T" to sit stably on a flat surface if it is inverted as shown in FIG. 2. The support structure has openings 9 at the ends that allows a connection from the drainage chamber 7 below the suspended floor 5 to the inside of the vertical solid ventilation shaft 4, and ultimately, to the upper opening 10 of the ventilation shaft, and the outside of the container. The solid ventilation shaft 4 penetrates the lid through a tight fitting hole. Notice that if these internal structures are molded from plastic, the number of parts may be reduced by combining them. For example, the vertical ventilation shaft 4 can be easily molded together with the support structure 8 or even with both the suspended floor 5 and the support structure 8. Finally, 12 is the enclosed space above the suspended floor and below the lid 3 which receives the compostable waste.

Preferred Embodiment—Operation

The operation of this embodiment of the invention, as shown in FIG. 1, begins with the removal of the lid 3 from the sealable container. Removal of the lid 3 requires that the lid be lifted straight up so that it slides up the vertical ventilation shaft 4 until separated from the rest of the container. The compostable waste is then deposited into enclosed space 12 and falls on the suspended floor 5. Any liquid present in or on the waste flows down through the holes 6 into the drainage chamber 7 and is thus separated from the solid waste. The absence of liquid water in the solid compostable material allows air to circulate all the way from the outside of the container through the waste. As can be seen in FIG. 1, air can enter the opening 10 at the top of the vertical ventilation shaft 4 and travel through the shaft and the support structure 8 and opening 9 into drainage chamber 7. Air in drainage chamber 7 can circulate into enclosed space 12 and the compostable waste through the ventilation/drainage holes 6 in the suspended floors. The circulating air favors aerobic conditions in the compostable waste and thus minimizes odors caused by anaerobic decomposition within the waste. In addition, the separation of liquid water also helps keep the waste from becoming anaerobic and producing objectionable odors.

The separated water that collects in drainage chamber 7 above the floor 2 of the container is sealed in and cannot escape even if the container is tipped because the lid 3 is sealed onto the main bucket-like portion 1.

Another feature of this embodiment of the invention is the accessibility of the vertical ventilation shaft 4 at the top of the container. This shaft can be grasped and lifted to help empty the container. It can also be used to lift and drop the suspended floors, thus promoting air circulation through the waste contained in enclosed space 12.

Other Embodiments
Alternate Embodiment—Description

Figure 4:
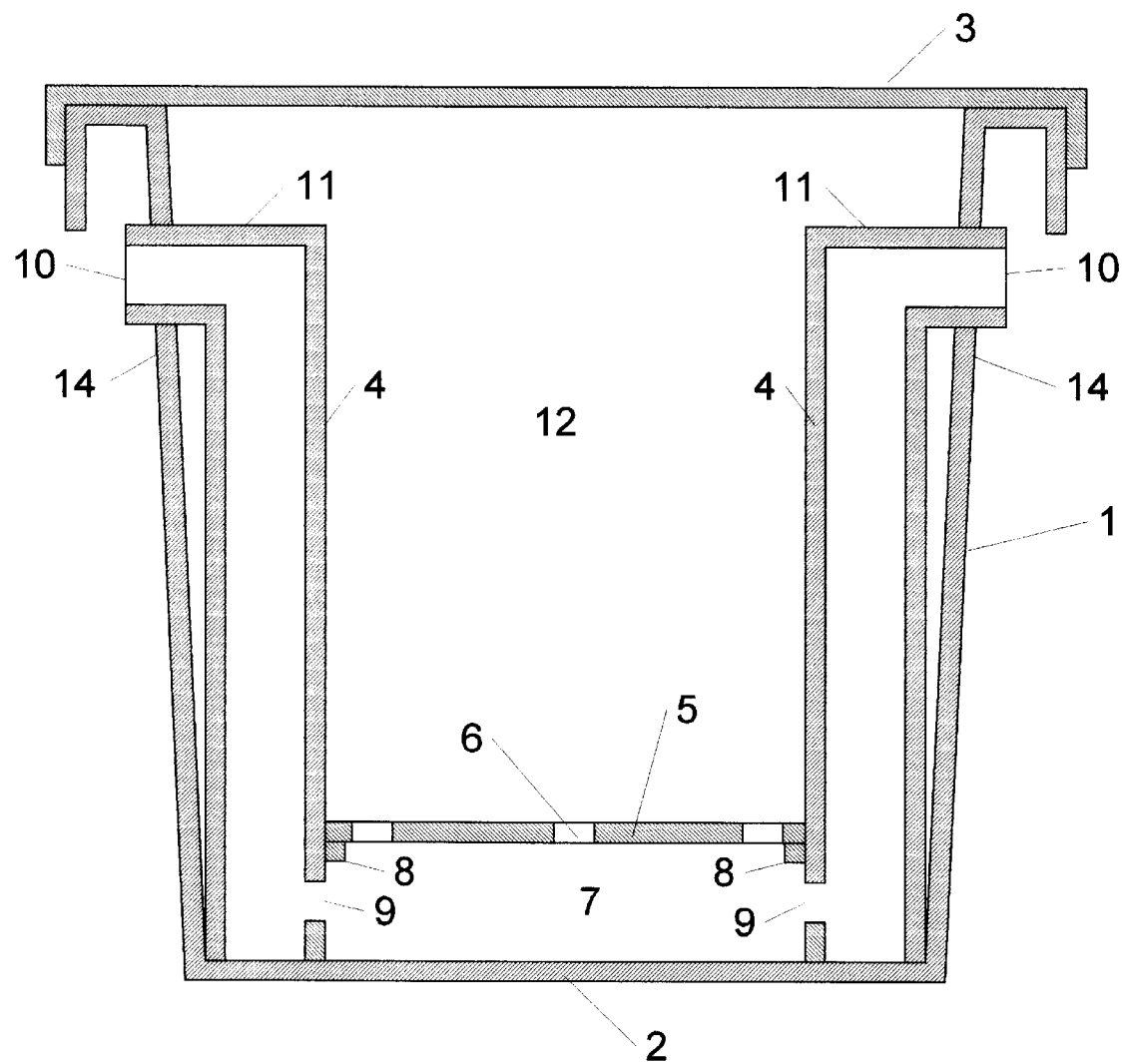
FIG. 4 is a sectional longitudinal view of the second embodiment of the invention.
Figure 5:
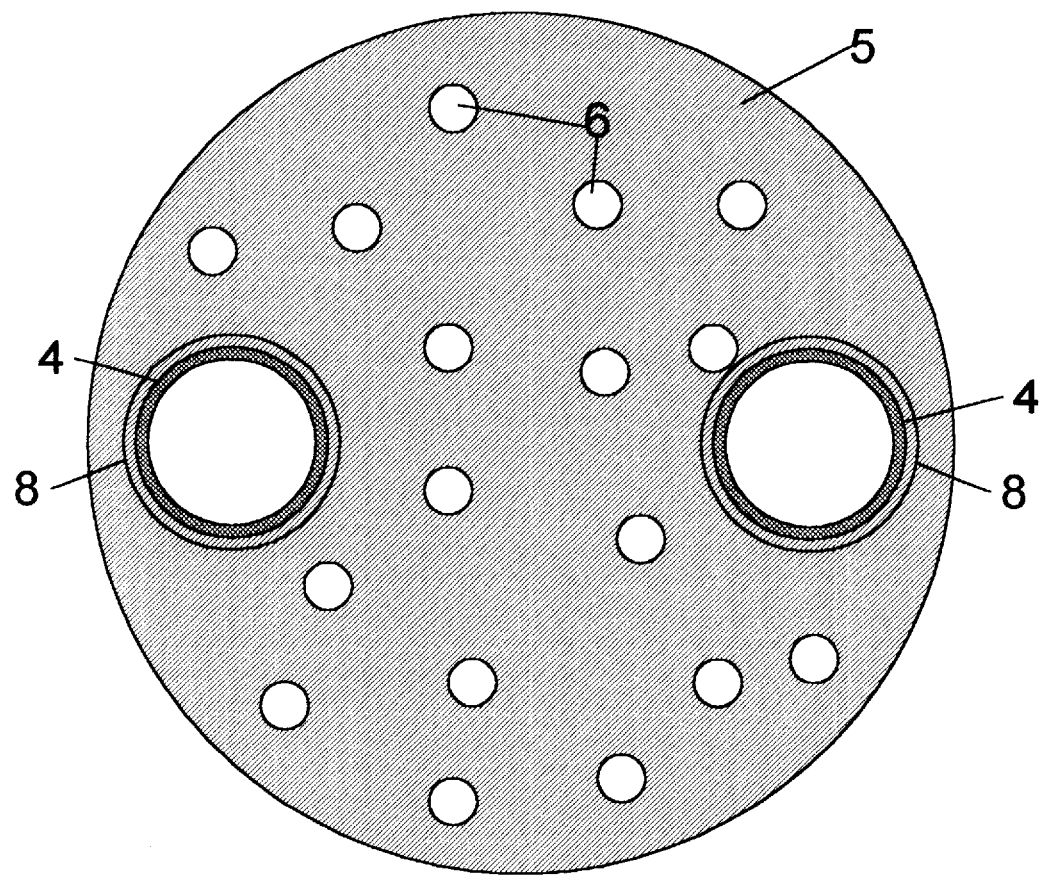
FIG. 5 is a top view of the lower portion of the ventilating device of the second embodiment of the invention. (Shaft elbows omitted).

A second embodiment of the invention is shown in FIGS. 4 and 5. The outside of this embodiment is similar to the first in that it has an air and water tight bucket-like portion 1 with integral bottom 2 and sealable lid 3. In this case the sealable lid 3 is not penetrated by any ventilation shaft. Instead, the vertical ventilation shaft(s) 4 are connected to the shaft elbow(s) 11. The elbow(s) 11, provide for tight fitting penetration of the upper container wall 14 to connect the solid ventilation shaft 4 to opening(s) 10 to the outside of the container. In this embodiment, one or multiple shafts may be employed, whereas in the first embodiment, multiple ventilation shafts penetrating the lid might make the installation of the lid difficult. The lower portion of the ventilation device of the second embodiment is similar to that of the first. There is a suspended floor 5 with drainage/ventilation holes 6 and opening(s) 9, connecting the lower airspace 7 to the solid ventilation shaft 4. Again, 12 is the space for receiving the compostable waste.

Alternate Embodiment—Operation

This embodiment is illustrated in FIG. 4. This embodiment operates in substantially the same manner of the first embodiment except that the solid ventilation shaft 4 penetrates the upper container wall 14 by means of shaft elbow(s) 11. As in the first embodiment, the lid 3 is removed to expose the space above the suspended floor 12 so that waste can be deposited therein. In this embodiment the lid 3 is easier to remove and replace because it is not penetrated by the solid ventilation shaft 4. This feature makes filling and emptying the container more convenient. The disadvantages of this configuration are increased difficulty of cleaning as well as higher cost and complexity of manufacture.

Conclusions, Ramifications, and Scope

Accordingly, it can be seen that the waste container of the invention provides an effective and economical means of storing compostable waste while minimizing any offensive odors emitted by the contained waste. In addition, the container provides a means to keep insect pests, which may be attracted by the waste, confined to the container. The container is easy to use, empty and clean as well as economical to manufacture.

Although the description above contains many specificities, these should not be construed as limiting the scope of the invention but as merely providing illustrations of some of the presently preferred embodiments of this invention. Various other embodiments and ramifications are possible within its scope. For example, referring to FIG. 1, the solid ventilation shaft 4, could, if the container were made of plastic, be molded as one piece with the wall of the container, and so, a non-leak connection from the upper opening 10 to the lower drainage chamber 7 would thus be provided. The solid ventilation shaft 4 could be replaced with a forced ventilation system whereby air could be forced by pressurization through tubing from outside the container into the lower drainage chamber 7 and up through the space 12 above the suspended floor 5. The openings to the outside of the container such as upper opening 10 could be provided with screens to prevent passage of insects. Those openings could also be provided with filters, such as activated charcoal filters to further reduce the possibility of odors escaping the container. Additional ventilation openings could be added in the lid 3 or the upper container wall 14, provided that they were thoroughly screened to prevent passage of insects or other pests. Thus the scope of the invention should be determined by the appended claims and their legal equivalents, rather than by the examples given.

What is claimed is:

1. A ventilated waste collecting container comprising:
   a lower bucket-like portion which is essentially air-and-waterproof whereby any solids or liquids placed therein are securely contained
   a lid which can be tightly sealed onto the lower bucket-like portion, forming a sealed container, whereby any enclosed wastes, liquids, and accompanying odors are securely contained even if the container is tipped and whereby direct access by pests is substantially restricted
   a means of promoting aerobic conditions in solid compostable waste having poles deposited in the container by preventing liquids from filling the pores within the solid waste comprising a liquid separating barrier permeable to liquids and gases, even when wet, but not solids within the sealed container forming a drainage chamber for the collection of liquids in the portion of the sealed container below the liquid separating barrier and also forming an enclosed space in the portion of the sealed container above the liquid separating barrier free of liquids for the storage of solid waste a means for providing air circulation through the solid waste in the enclosed space within the sealed container above the liquid separating barrier and preventing direct access of air and accompanying odors or pests between the outside of the container and the enclosed space above the liquid separating barrier and which prevents spillage of any liquid that may accumulate in the drainage chamber comprising at least one solid walled ventilation shaft which opens only in the lower drainage chamber of the container on one end, and penetrates by means of a tight-fitting hole either the lid or the upper wall of the lower bucket-like portion of the container, and opens outside the upper three-fourths of the sealed container on the other end.

2. The container of claim 1 wherein the liquid separating barrier comprises a perforated suspended floor or grating located above the bottom of the lower bucket-like portion of the sealed container.

3. The container of claim 2 wherein the solid walled ventilation shaft and suspended floor are of sufficient strength that they can be used to lift the enclosed waste out of the container by grasping and lifting the solid walled ventilation shaft after the removal of the lid.

4. The container of claim 1 wherein air is forced into or withdrawn from the sealed container through the wall of the lower bucket-like portion or the lid and allowed to escape or enter, as the case may be, to equalize the interior and exterior air pressure, through the solid walled ventilation shaft to enhance air circulation and promote aerobic conditions within the container and the enclosed solid waste.

5. The container of claim 1 wherein special provision is made for fitting the solid walled ventilation shaft through the lid of the container by shaping the lid into an inverted cone shape around the hole to guide the lid into proper position for closure when the lid is placed upon the solid walled ventilation shaft.

6. A method for temporarily storing compostable waste comprising:

a. placing solid compostable waste having poles in a ventilated container which has features including:

a lower bucket-like portion which is essentially air- and-waterproof whereby any solids or liquids placed therein are securely contained a lid which can be tightly sealed onto the lower bucket-like portion, forming a sealed container, whereby any enclosed wastes, liquids, and accompanying odors are securely contained even if the container is tipped and whereby direct access by pests is substantially restricted b. promoting aerobic conditions in the solid waste deposited in the container by preventing liquids from filling the pores within the solid waste by providing a liquid separating barrier permeable to liquids and gases, even when wet, but not permeable to solids, within the sealed container forming a drainage chamber for the collection of liquids in the portion of the sealed container below the liquid separating barrier and also forming an enclosed space in the portion of the sealed container above the liquid separating barrier free of liquids for the storage of solid waste c. providing air circulation through the solid waste in the enclosed space within the sealed container above the liquid separating barrier while preventing direct access of air and accompanying odors or pests between the outside of the container and the enclosed space above the liquid separating barrier and preventing spillage of any liquid that may accumulate in the drainage chamber by providing at least one solid walled ventilation shaft which opens only in the lower drainage chamber of the container on one end, penetrates by means of a tight-fitting hole, either the lid or the upper wall of the lower bucket-like portion of the container, and opens outside the upper three-fourths of the sealed container on the other end d. securely placing the lid on the lower bucket-like portion to prevent easy access by pests or escape of objectionable odors when waste is not being added to the container.

7. A method for storing compostable waste of claim 6 wherein aerobic conditions are promoted in the solid waste by a liquid separating barrier comprising a perforated suspended floor or grating located above the bottom of the lower bucket-like portion of the sealed container.

8. The method for storing compostable waste of claim 7 wherein the solid waste can be removed from the container by lifting the solid walled ventilation shaft and suspended floor and enclosed waste out of the container by grasping and lifting the solid walled ventilation shaft after the removal of the lid.

9. The method for storing compostable waste of claim 6 wherein aerobic conditions are promoted by increasing air circulation within the solid waste by forcing air into or withdrawing air from the sealed container through the wall of the lower bucket-like portion or the lid of the sealed container and allowing air to escape or be drawn into the container, as the case may be, through the solid walled ventilation shaft.

10. The method for storing compostable waste of claim 6 wherein special provision is made for fitting the lid onto the container over the solid walled ventilation shaft, when the shaft is centrally located in the lower bucket-like portion, by shaping the lid into an inverted cone shape around the hole to guide the lid into proper position for closure when the lid is placed upon the solid walled ventilation shaft.

* * * * *